July 2, 1957     M. TAYLOR     2,797,580
GYROSCOPE SUSPENSION
Filed July 18, 1955

INVENTOR.
MARVIN TAYLOR
BY
ATTORNEY.

2,797,580
Patented July 2, 1957

2,797,580
GYROSCOPE SUSPENSION

Marvin Taylor, Bethpage, N. Y., assignor to American Bosch Arma Corporation, a corporation of New York Application July 18, 1955, Serial No. 522,426

6 Claims. (Cl. 74—5)

The present invention relates to suspension means for gyroscopes and has particular reference to torque applying suspensions.

Prior gyroscopes using torsion members between the gyroscope and the follow-up gimbal rings for positioning the gyroscope and for applying precessing torques to the gyroscope have used fluid suspension for supporting the weight of the gyroscope and its gimbals. The use of the fluid flotation however, necessitates precise temperature control, observation of special precautions for fluid-tight construction and creates numerous operating and production difficulties.

The purpose of the present invention is to eliminate the necessity of fluid flotation by providing a torsion member having low torsional stiffness, yet having high beam strength and stiffness, so that the torsion member itself can support the weight of the gyroscope and gimbals.

A solid torsional member having a cross section which resembles a regular polygon and having the necessary beam strength is much too rigid torsionally, and vice versa, a torsional wire of suitable torsional stiffness is too weak to support the gyroscope and gimbal ring.

It has been found that the shape of a thin walled structure, inherently having low torsional stiffness, can be chosen so as to have considerable lateral stiffness which is the same in all transverse directions. Cross sectional shapes of such torsion members would be the equilateral Y or X for optimum operation. However, for ease of manufacture and economy, the preferred embodiment is a V-shaped channel having a dihedral angle of substantially 53.1°.

For a more complete understanding of the invention, reference may be had to the accompanying diagrams in which, Figure 1 shows that part of a gyro compass using a suspension according to this invention;

Figure 1:
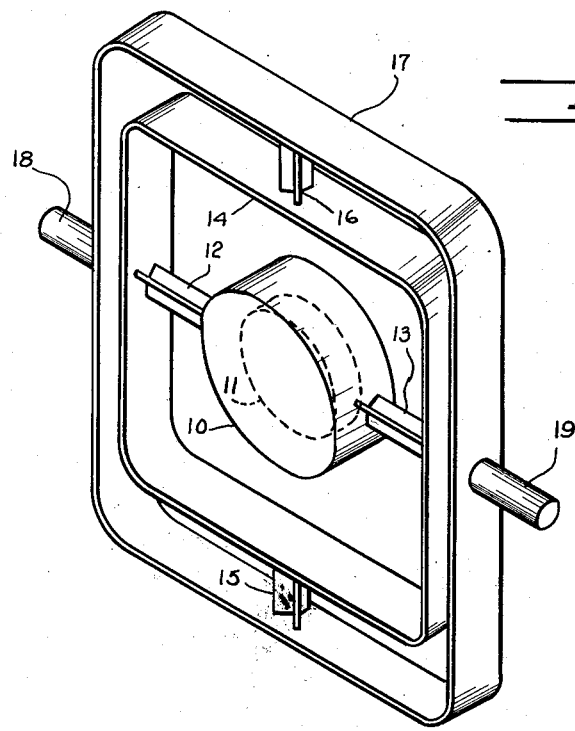

Referring now to the figures, the gyroscopic device shown in Fig. 1 is an adaptation of a part of the device shown in Fig. 1 of U. S. Patent 2,677,194 according to the present invention. Only the sensitive element, i. e., the gyroscope and its associated inner gimbals is shown here. The sensitive element may be suspended from the deck of the vehicle carrying the compass in the manner illustrated in the aforementioned patent.

More particularly, in Fig. 1, the numeral 10 represents the gyro casing containing a rotating gyroscope wheel 11. The casing 10 is supported by horizontal torsion members 12 and 13, the torsional axes of which are aligned with each other and pass through the center of gravity of the gyro assembly 10, 11.

The outer ends of torsion members 12, 13 are secured to the inner vertical gimbal ring 14 which in turn is supported in the outer vertical gimbal frame 17 by the vertical torsion members 15 and 16. The torsional axes of members 15 and 16, aligned with each other and passing through the center of gravity of gyro assembly 10, 11, are perpendicular to the torsional axis through members 12, 13. The vertical frame 17 is supported by its shafts 18 and 19 in a customary gyro compass gimbal suspension not shown but which may be similar to that supporting the tank 17 in Patent 2,677,194.

It will be seen that without the fluid suspension of Patent 2,677,194 the torsion members 12, 13, 15 and 16 must have considerable lateral stiffness in all directions to support the weight of the gyro wheel 11, casing 10 and gimbal ring 14 and to maintain their positional stability during accelerations of the gyro support (not shown).

Since the amount of torque applied by means of the torsion members 12, 13, 15 and 16 through displacement of the gimbal rings 14 and 17 from the plane of the gyro wheel 11 is controlled by controlling the relative displacements between the respective members, the torsional stiffness of the torsion members must be low enough to permit this displacement to be a reasonable amount such as may be required by the sensitivity of the pickoff devices and the accuracy of the servo drives, not shown.

Thus, the torsion member must be of a shape which will produce the desired characteristics of maximum beam strength and stiffness coupled with minimum torsional stiffness. In addition, the lateral strength and stiffness should be substantially equal in all directions so that rotational alignment of opposite torsion members will not be critical. This latter condition may be realized by symmetry or by conscious design of the section toward this end.

Figures 2, 3:
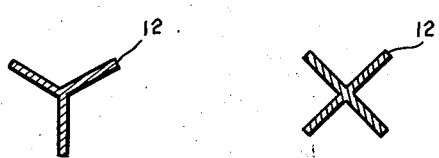
Figure 2 is a cross section of one embodiment of the suspension member.
Figure 3 is a cross section of another embodiment of the suspension member.
Figure 4:
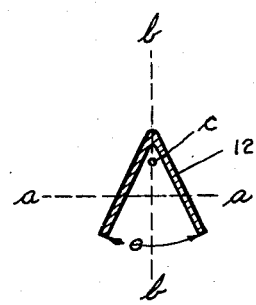
Figure 4 is a cross section of a preferred embodiment of the suspension member.

In accordance with the requisites of the preceding paragraph, any of the sections of Figures 2, 3 or 4 may be used. Thus Figure 2 shows an equilateral Y section and Figure 3 shows an equilateral X section, each being constructed of thin material having a ratio of total length of the arms to the thickness of the material in excess of 10:1. In each of these sections, the center of twist is at the center of the intersection of the arms, and the longitudinal axis through this center should therefore pass through the center of gravity of the gyro assembly 10, 11. Since both the X and Y sections must be fabricated by machining, the manufacture of appropriate torsion members may be costly.

Accordingly a simpler, easily manufactured shape is shown in Fig. 4. The V-shaped cross section is designed to have the same moment of inertia of the area about the axis $aa$ and the axis $bb$. Calculation shows that in order to obtain these equal moments of inertia of the area the dihedral angle $\theta$ must be substantially equal to 53.1°. The center of twist of this section will be close to the intersection of the legs of the V, at a point C on the axis $bb$.

I claim:

1. In a device of the character described, a gyroscope, first torsion members supporting said gyroscope in a gimbal, a follow up member, second torsion members supporting said gimbal in said follow up member, at least one of said torsion members having high beam strength and stiffness and low torsional stiffness, which is substantially equal in all transverse directions.

2. In a device of the character described, a gyroscope, first torsion members supporting said gyroscope in a gimbal, a follow up member, second torsion members supporting said gimbal in said follow up member, certain of said torsion members having high beam strength and stiffness and low torsional stiffness, said torsion members having a substantially V-shaped cross section.

3. In a device of the character described, a gyroscope, first torsion members supporting said gyroscope in a gimbal, a follow up member, second torsion members supporting said gimbal in said follow up member, certain of said torsion members having high beam strength and stiffness and low torsional stiffness, said torsion members having a substantially V-shaped cross section with angular formation of approximately 53.1 degrees.

4. In a device of the character described, a gyroscope, first torsion members supporting said gyroscope in a gimbal, a follow up member, second torsion members supporting said gimbal in said follow up member, certain of said torsion members having high beam strength and stiffness and low torsional stiffness, said torsion members having a substantially X-shaped cross section.

5. In a device of the character described, a gyroscope, first torsion members supporting said gyroscope in a gimbal, a follow up member, second torsion members supporting said gimbal in said follow up member, certain of said torsion members having high beam strength and stiffness and low torsional stiffness, said torsion members having a substantially Y-shaped cross section.

6. In a device of the character described, a gyroscope, torsion members supporting said gyroscope in a gimbal, a follow up member, second torsion members supporting said gimbal in said follow up member, certain of said torsion members comprising bars having high beam strength and stiffness and low torsional stiffness, which is substantially equal in all transverse directions.

References Cited in the file of this patent

UNITED STATES PATENTS

| | | |
|---|---|---|
| 2,291,612 | Draper | Aug. 4, 1942 |
| 2,517,612 | Varian | Aug. 8, 1950 |
| 2,677,194 | Bishop | May 4, 1954 |
| 2,685,207 | Barkalow et al. | Aug. 3, 1954 |
| 2,735,731 | Freebairn et al. | Feb. 21, 1956 |

FOREIGN PATENTS

| | | |
|---|---|---|
| 592,099 | Germany | Feb. 1, 1934 |